United States Patent
Salkintzis et al.

(10) Patent No.: US 9,232,465 B2
(45) Date of Patent: *Jan. 5, 2016

(54) METHOD AND DEVICE FOR SELECTING OR EXCLUDING AN ACCESS POINT FOR USE IN WIRELESSLY CONNECTING TO A NETWORK

(71) Applicant: MOTOROLA MOBILITY LLC, Libertyville, IL (US)

(72) Inventors: Apostolis K. Salkintzis, Athens (GR); Walter Featherstone, Meysey Hampton (GB)

(73) Assignee: Google Technology Holdings LLC, Mountain View, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/055,904

(22) Filed: Oct. 17, 2013

(65) Prior Publication Data
US 2015/0110087 A1  Apr. 23, 2015

(51) Int. Cl.
H04W 4/00 (2009.01)
H04W 48/20 (2009.01)
H04W 36/30 (2009.01)
H04W 36/26 (2009.01)
H04W 48/02 (2009.01)

(52) U.S. Cl.
CPC .............. *H04W 48/20* (2013.01); *H04W 36/26* (2013.01); *H04W 36/30* (2013.01); *H04W 48/02* (2013.01)

(58) Field of Classification Search
CPC ...... H04W 36/30; H04W 36/26; H04W 48/20
USPC ....................................................... 370/338
See application file for complete search history.

(56) References Cited

U.S. PATENT DOCUMENTS

| 7,613,142 B2 | 11/2009 | Molteni et al. |
| 7,907,582 B2 | 3/2011 | Du et al. |
| 2005/0094558 A1 | 5/2005 | Lu |

(Continued)

FOREIGN PATENT DOCUMENTS

| JP | 2012199921 A | 10/2012 |
| KR | 20130055501 A | 5/2013 |

OTHER PUBLICATIONS

International Search Report and Written Opinion for Application No. PCT/US2014/060836 dated Jan. 14, 2015.
Apostolis K. Salkintzis, "Method and Device for Accepting or Rejecting a Request Associated with a Mobile Device Wirelessly Connecting to a Network" U.S. Appl. No. 14/088,613, filed Nov. 25, 2013, 32 pages.

*Primary Examiner* — Sai-Ming Chan
(74) *Attorney, Agent, or Firm* — Lerner, David, Littenberg, Krumholz & Mentlik, LLP

(57) ABSTRACT

A method is performed in a mobile device for selecting or excluding an access point for use in wirelessly connecting to a network. The method includes collecting historical connection data for a first access point, wherein the historical connection data identifies a plurality of previous wireless connections to the network using the first access point and identifies a corresponding duration of each previous wireless connection. The method further includes: detecting that the first access point is available for a current wireless connection to the network; calculating an expected connection duration for the first access point using the historical connection data; and determining whether to select or exclude the first access point as a candidate for the current wireless connection based on the expected connection duration calculated for the first access point.

20 Claims, 4 Drawing Sheets

(56) References Cited

U.S. PATENT DOCUMENTS

| | | |
|---|---|---|
| 2006/0019653 A1 | 1/2006 | Stamoulis et al. |
| 2011/0216692 A1 | 9/2011 | Lundsgaard et al. |
| 2012/0294377 A1 | 11/2012 | Vijayasankar et al. |
| 2013/0090115 A1 | 4/2013 | Deivasigamani et al. |
| 2013/0100819 A1* | 4/2013 | Anchan et al. ............. 370/241 |
| 2013/0223340 A1 | 8/2013 | Jeong |
| 2014/0365642 A1* | 12/2014 | Lam et al. ................. 709/224 |

\* cited by examiner

METHOD AND DEVICE FOR SELECTING OR EXCLUDING AN ACCESS POINT FOR USE IN WIRELESSLY CONNECTING TO A NETWORK

FIELD OF THE DISCLOSURE

The present disclosure relates to electronic devices such as mobile devices and, more particularly, to methods and devices for selecting or excluding an access point for use in wirelessly connecting to a network.

BACKGROUND

Mobile electronic devices, such as smartphones and tablet computers, continue to evolve through increasing levels of performance and functionality as manufacturers design products that offer consumers greater convenience and productivity. One such convenience is a mobile device's capability of automatically connecting wirelessly to a communication network or network, such as the Internet, using a Wireless Local Area Network (WLAN) including one or more wireless access points (APs). A wireless access point, also referred to herein simply as an access point, typically has a wired connection to the network and facilitates a wireless connection between a mobile device and the network.

With the high rate of wireless access point deployment, e.g., in private WLANs such as in work environments and in public WLANs such as hotspots in retail environments, mobile devices can automatically establish wireless connections in nearly every location that a user might travel. Such increased accessibility to networks by more and more users is generally desired. However, this increased accessibility has its drawbacks, especially where a mobile device automatically searches for and connects to available APs.

More particularly, many wireless connections are far too short for a user to take advantage of the connection. Nonetheless, as the number of these shorter connections increase, the greater the strain on battery life suffered by a mobile device without providing at least a commensurate benefit to a user. Moreover, these shorter connections needlessly burden the network with increased signaling traffic. Such traffic includes, for example, signaling between the mobile device and the network to establish and tear down the connections and signaling to authenticate the mobile device and perhaps the user to the network, for instance authentication, authorization, and accounting (AAA) signaling.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
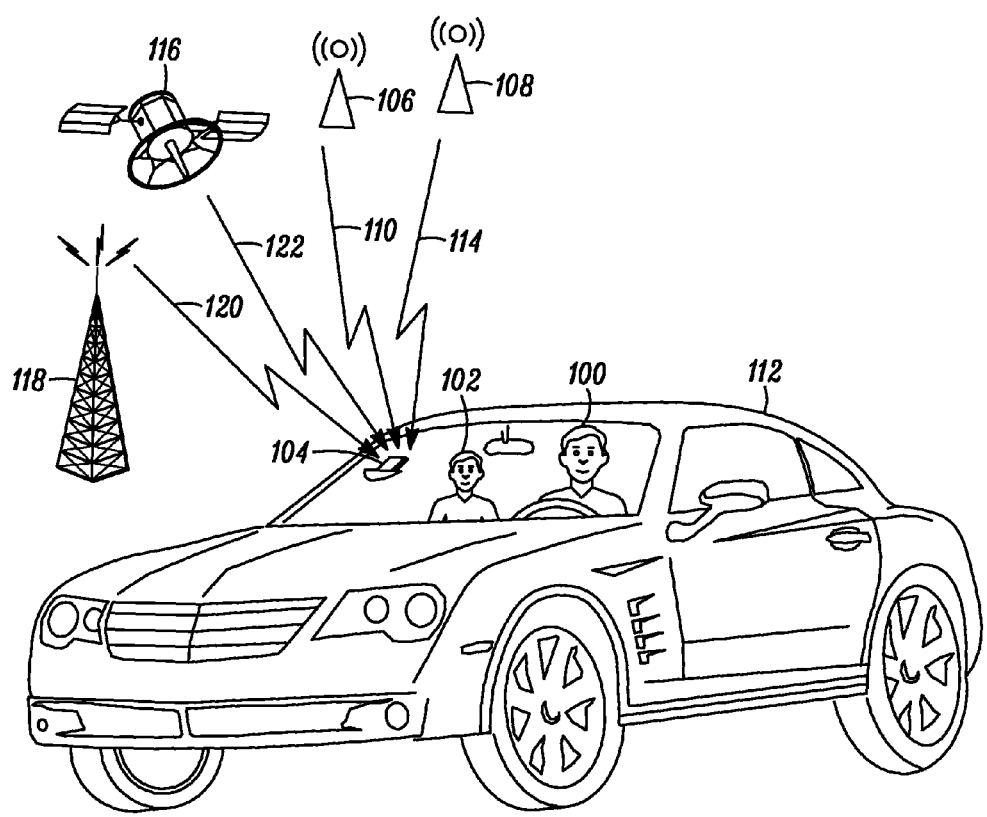
FIG. 1 is a schematic diagram of an example environment within which may be implemented methods and devices for selecting or excluding an access point for wirelessly connecting to a network in accordance with embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of disclosed embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and mobile device for selecting or excluding an access point for use in wirelessly connecting to a network. The device collects historical connection data for a plurality of access points to use in selecting an available access point for a current connection to the network. For at least some available access points, the historical connection data identifies a plurality of previous wireless connections using the access point and corresponding durations of those previous wireless connections.

For each available access point, the mobile device, e.g., using a processing device, determines an expected connection duration for the current wireless connection. This action is interchangeably referred to herein as predicting a connection duration for a current wireless connection. For the available access points having, associated therewith, historical connection data, the expected (i.e., predicted) connection duration is calculated as a function of the durations of the plurality of previous wireless connections identified in the historical connection data. In a particular embodiment, the function is a weighted average of those durations. The mobile device compares the expected connection durations of all of the available access points. The mobile device further selects, for the current connection, the access point with an expected connection duration that exceeds a threshold duration and that, in one embodiment, is the highest expected connection duration of all the available access points.

Accordingly, provided in one embodiment is a mobile device that performs a method for selecting or excluding an access point for use in wirelessly connecting to a network. The mobile device includes a transceiver configured to establish a plurality of previous wireless connections to the network using a first access point. The mobile device is configured, for example using a processing device, to collect historical connection data for the first access point. The mobile device further includes a memory component configured to store the historical connection data, which identifies the plurality of previous wireless connections and identifies a corresponding duration of each previous wireless connection. Additionally, the processing device of the mobile device is configured to determine or detect that the first access point is available for a current wireless connection to the network and calculate an expected connection duration for the first access point using the historical connection data. In an embodiment, the processor is configured to predict a connection duration for the first access point using a function of the durations of the plurality of previous wireless connections identified in the historical connection data. Moreover the processing device is configured to determine whether to select or exclude the first access point as a candidate for the current wireless connection based on the expected, i.e., predicted, connection duration calculated for the first access point.

In one embodiment, the processing device is configured to select the first access point as a candidate for the current wireless connection when the predicted connection duration exceeds a threshold. Moreover, the processing device is configured to select the first access point for the current wireless connection when the predicted connection duration is a highest predicted connection duration among predicted connection durations for at least one other candidate access point. In addition, the processing device is configured to exclude from current and future consideration for a wireless connection, at least for some limited time period in one particular embodiment, the first access point as a candidate for the current wireless connection when the predicted connection duration is below a threshold.

By implementing one or more embodiments of the present teachings, a mobile device can be "trained," in a sense, to avoid APs that provide short-lived wireless connections (e.g., less than a threshold duration). As a consequence, for example: battery life in the mobile device can be preserved; signaling traffic to establish and terminate the wireless connections and/or AAA signaling can be reduced; and applications in the mobile device can avoid frequently re-establishing Transmission Control Protocol (TCP) connections associated with short-lived radio access technology (RAT) connections that support at least some of the wireless connections.

Turning now to FIG. 1, illustrated therein is a schematic diagram of an example environment within which may be implemented methods and devices for selecting or excluding an access point for use in wirelessly connecting to a network in accordance with the present teachings. In this particular embodiment, an electronic device 104, which, in this example is a mobile or portable device, is docked within a docking station on a windshield of a motor vehicle 112 (also referred to herein simply as a "vehicle").

In this illustrative embodiment, the vehicle 112 contains a driver 100 and a passenger 102, either or both of which can be a user of the device 104. The device 104 is configured for establishing wireless connections 120 to other mobile or portable devices for exchanging data and voice communications, for instance, using infrastructure equipment such as a cellular tower or base station 118. The device 104 may also be configured for establishing wireless connections 122 with other infrastructure equipment such as a satellite 116. In one example implementation, wireless connections 122 are used to determine the geographic location of the device 104.

In this illustrated embodiment, the device 104 is further configured for establishing wireless connections, e.g., 110 and 114, with one or more access points, e.g., 106 and 108, respectfully. These access points are, for instance, part of at least one WLAN. In accordance with the teachings herein, methods can be performed by the mobile device 104 for selecting or excluding access points, such as the access points 106 and 108, for a connection to a network such as the Internet or some other network.

Figure 2:
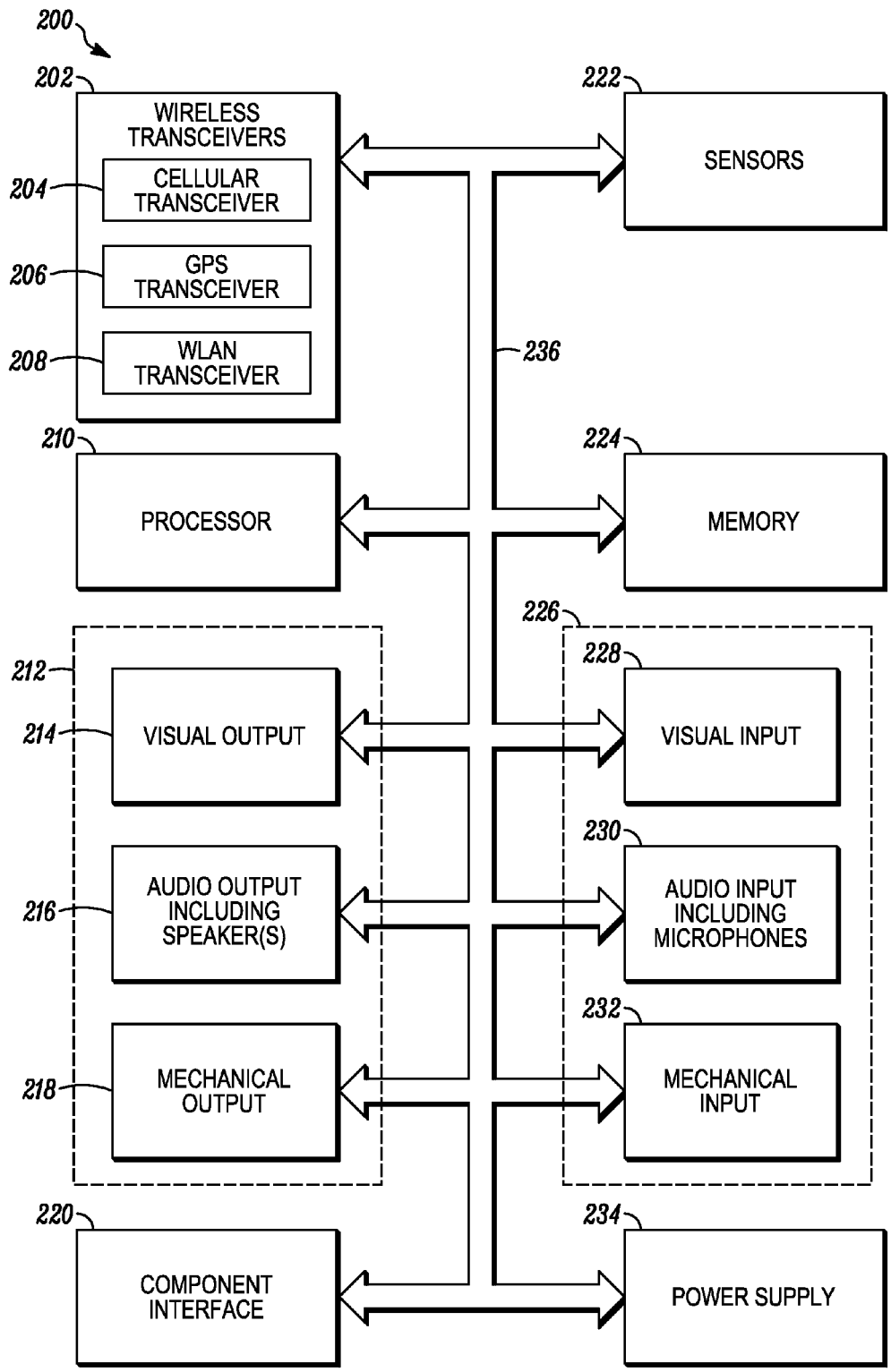
FIG. 2 is a block diagram showing example components of a mobile device illustrated in FIG. 1.

Referring now to FIG. 2, there is provided a block diagram illustrating example internal components 200 of the mobile device 104 of FIG. 1, in accordance with the present embodiment. The mobile device 104 is intended to be representative of a variety of mobile devices including, for example, cellular telephones, personal digital assistants (PDAs), smart phones, or other handheld or portable electronic devices. In alternate embodiments, the mobile device is an audio- or video-file player such as a MP3 player, a personal media player (PMP) or an iPOD; a navigation device; or another electronic device capable of or configured to select or exclude access points for use in wirelessly connecting to a network in accordance with the present teachings.

As shown in FIG. 2, the internal elements or components 200 include one or more wireless transceivers 202, one or more processors 210, output components 212, a component interface 220, one or more sensors 222, a memory component 224, input components 226, and a power supply 234. As further illustrated, the internal components 200 are coupled to one another, and in communication with one another, by way of one or more internal communication links 236, for instance an internal bus. A limited number of device components 202, 210, 212, 220-226, and 234 are shown at 200 for ease of illustration, but other embodiments may include a lesser or greater number of such components in a device, such as device 104. Moreover, other elements needed for a commercial embodiment of a device that incorporates the components shown at 200 are omitted from FIG. 2 for clarity in describing the enclosed embodiments.

We now turn to a brief description of the components within the schematic diagram 200. In general, the processor 210, memory component 224, and wireless transceivers 202 (particularly a WLAN transceiver 208) are configured with functionality in accordance with embodiments of the present disclosure as described in detail below with respect to the remaining FIGS. 3-4. "Adapted," "operative," "capable" or "configured," as used herein, means that the indicated components are implemented using one or more hardware elements, which may or may not be programmed with software and/or firmware as the means for the indicated components to implement their desired functionality. Such functionality is supported by the other hardware shown in FIG. 2, including the device components 212, 220, 222, 226, and/or 234.

Continuing with the brief description of the device components shown at 200, as included within the device 104, the wireless transceivers 202 include a cellular transceiver 204, a Global Positioning System (GPS) transceiver 206, and the WLAN transceiver 208. More particularly, the cellular transceiver 204 is configured to conduct cellular communications of data over the wireless connections 120 using any suitable wireless technology, such as Third Generation (3G), Fourth Generation (4G), 4G Long Term Evolution (LTE), vis-à-vis cell towers or base stations, such as the base station 118. In other embodiments, the cellular transceiver 204 is configured to utilize any of a variety of other cellular-based communication technologies such as analog communications (using Advanced Mobile Phone System—AMPS), digital communications (using Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.), and/or next generation communications (using Universal Mobile Telecommunication System (UMTS), Wideband CDMA (WCDMA), LTE, Institute of Electrical and Electronics Engineers (IEEE) 802.16, etc.) or variants thereof.

By contrast, the WLAN transceiver 208 is a Wireless Fidelity (Wi-Fi) transceiver 208 configured to conduct Wi-Fi communications in accordance with the IEEE 802.11 (a, b, g, or n)

standard with access points. In other embodiments, the WLAN transceiver 208 instead (or in addition) conducts other types of communications commonly understood as being encompassed within Wi-Fi communications such as some types of peer-to-peer (e.g., Wi-Fi Peer-to-Peer) communications. Further, in other embodiments, the Wi-Fi transceiver 208 is replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology. Moreover, the transceivers 202 enable the determination of the geographic location of the mobile device 104. This is accomplished, for example, using the GPS transceiver 206 and/or the cellular transceiver 204.

The processor 210 includes arithmetic logic and registers necessary to perform the digital processing required by the device 104 to, for example, collect and process historical connection data to select or exclude one or more access points for the device 104 to use in wirelessly connecting to a network in a manner consistent with the embodiments described herein. For one embodiment, the processor 210 represents a primary microprocessor of the device 104 such as an application processor of a smartphone 104. In another embodiment, the processor 210 is an ancillary processor, separate from a central processing unit (CPU, not shown), which is dedicated to providing the processing capability, in whole or in part, needed for the device elements 200 to perform their intended functionality.

In the embodiment shown, the output components 212 include: one or more visual output components 214 such as a liquid crystal display and/or light emitting diode indicator; one or more audio output components 216 such as a speaker, alarm, and/or buzzer; and one or more mechanical output components 218 such as a vibrating mechanism. Similarly, the input components 226 include one or more visual input components 228 such as a camera lens and photosensor; one or more acoustic receiver or audio input components 230 such as one or more transducers (e.g., microphones), including for example a microphone array and beamformer arrangement or a microphone of a Bluetooth headset; and one or more mechanical input components 232 such as a touchscreen display, a flip sensor, keyboard, keypad selection button, and/or switch.

As mentioned above, this embodiment of internal components 200 also includes one or more of various types of sensors 222 as well as a sensor hub to manage one or more functions of the sensors. The sensors 222 include, for example, proximity sensors (e.g., a light detecting sensor, an ultrasound transceiver or an infrared transceiver), touch sensors, altitude sensors, an accelerometer, a tilt sensor, and a gyroscope, to name a few.

The memory component 224 encompasses, in some embodiments, one or more memory elements of any of a variety of forms, for example read-only memory, random access memory, static random access memory, dynamic random access memory, etc. In an embodiment, the processor 210 uses the memory component 224 to store and retrieve data such as historical connection data. In some embodiments, the memory component 224 is integrated with the processor 210 into a single component such as on an integrated circuit. However, such a single component still usually has distinct portions/sections that perform the different processing and memory functions.

The data that is stored by the memory component 224 includes, but need not be limited to, operating systems, programs (applications), and informational data. Each operating system includes executable code that controls basic functions of the mobile device 104, such as interaction among the various components included among the internal components 200, communication with external devices via the wireless transceivers 202 and/or the component interface 220, and storage and retrieval of programs and data, to and from the memory component 224. As for programs, each program includes executable code that utilizes an operating system to provide more specific functionality, such as file system service and handling of protected and unprotected data stored in the memory component 224. Such programs include, among other things, programming for enabling the mobile device 104 to perform methods or processes such as described below by reference to FIGS. 3-4. Finally, with respect to informational data, this is non-executable code or information that an operating system or program references and/or manipulates, in one embodiment, for performing functions of the mobile device 104.

In an embodiment, the component interface 220 provides a direct connection to auxiliary components such as a docking station or printer or accessories for additional or enhanced functionality. The power supply 234, such as a battery, provides power to the other internal components 200 while enabling the mobile device 104 to be portable.

Figure 3:
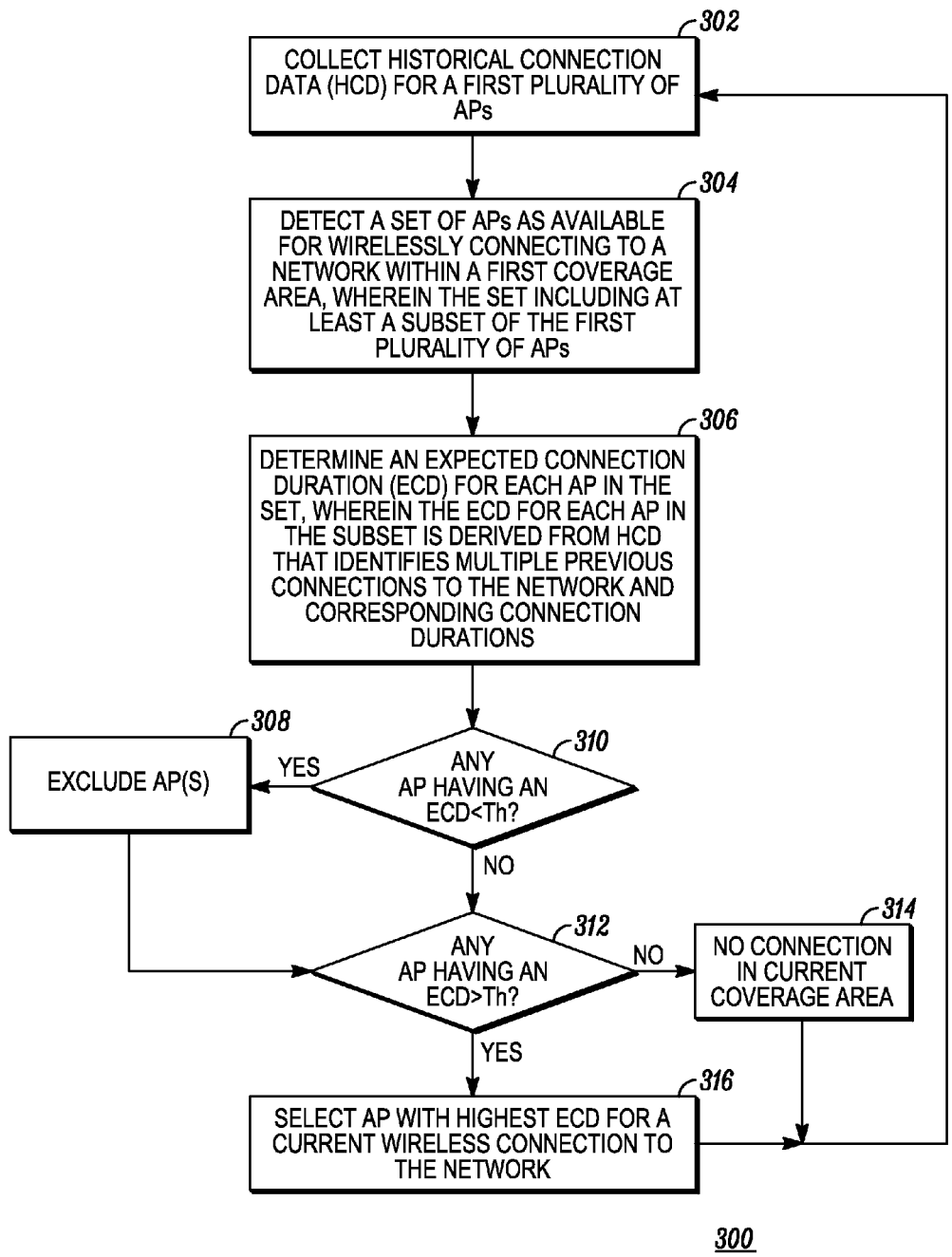
FIG. 3 is a flow diagram showing one embodiment of a general method for selecting or excluding an access point for use in wirelessly connecting to a network in accordance with the present teachings.

We turn now to a detailed description of the functionality of the device 104 and device components 200 shown in FIGS. 1 and 2, respectively, in accordance with the teachings herein and by reference to the remaining figures. FIG. 3 is a logical flow diagram illustrating a general method 300 performed by a device, such as the device 104, for selecting or excluding an access point for use in wirelessly connecting to a network. In the method 300, the mobile device 104 encounters multiple access points, such as access points 106 and 108, from which the device 104 can select to facilitate a current wireless connection to a network. A method 400 illustrated in FIG. 4 describes a particular example process that the device 104 can perform in accordance with the present teaching with respect to each available access point to specifically determine whether to select or exclude that access point as a candidate for facilitating the current wireless connection.

Turning back to method 300, in general, the device 104, e.g., the processor 210, collects 302 historical connection data for a first plurality of wireless access points. As used herein historical connection data ("HCD") for an access point is data that identifies, at a minimum, one or more actual previous wireless connections for the access point and the durations of those connections. Table 1 below illustrates example historical connection data stored for an access point, such as the access point 106 or 108.

TABLE 1

| Connection Number | Connection Duration (minutes) | Expected Connection Duration (minutes) |
|---|---|---|
| 0 | — | 5 |
| 1 | 1 | 3 |
| 2 | 0.6 | 2.1 |
| 3 | 0.5 | 1.16 |
| 4 | 0.8 | 0.58 |

This particular implementation of Table 1 contains a first column that identifies a connection number, a second column that identifies a connection duration for each connection number, and a third column that identifies a calculated expected connection duration for at least some of the connection numbers. Additional information not shown but that may be a part of the historical connection data includes, but is not limited to: an identifier or name for the WLAN network, e.g., a service set identifier (SSID); and an identifier or address for the wireless access point, e.g., a basic service set identification (BSSID).

In an embodiment, the connection numbers 1-4 each identify an actual previous wireless connection at some point in time between the device 104 and the network using this particular access point. Thus, the connection number, in essence, tracks when a wireless connection was made using a particular access point. In this example, the previous wireless connections are identified by integer numbers with the connections being more recent in time having the higher connection numbers. Thus, connection 1 occurred first in time, followed by connection 2, then connection 3, and finally connection 4. However, any delineation can be used to identify the relative timing of the previous connections, such as a time stamp, in an alternative implementation.

As can be seen, each of the previous wireless connections 1-4 has associated therewith a duration of the connection measured in minutes and a calculated expected connection duration also determined in minutes. However, any suitable unit of time can be substituted for minutes. The expected or predicted connection duration is a calculated value that represents an amount of time the mobile device expects to be connected to a particular access point based on one or more previous wireless connections to this access points. One particular manner of calculating the expected connection duration is discussed in further detail below by reference to FIG. 4.

Moreover, in this embodiment of the historical connection data, connection 0 does not represent an actual previous wireless connection. Instead, connection 0 represents an initialization or re-initialization (i.e., a resetting) of the historical connection data. The corresponding value for connection 0 recorded in the third column represents an initial value that can be used to calculate the expected connection duration once the device 104 actually uses this access point for one or more wireless connections to the network. With further respect to resetting the historical connection data, in an embodiment described in further detail below, the device 104 excludes one or more access points from consideration for a connection to the network when an expected connection duration for the access point falls below a minimum acceptable connection time. When this occurs, the access point could be permanently excluded from consideration. However, an alternative option is to automatically reconsider the excluded access point at some point in the future for use in wirelessly connecting to the network. Is such a case, any historical connection data for the access point is reset or re-initialized and new historical connection data collected to determine an expected connection duration for the access point.

With further regard to the general method 300, the mobile device 104 detects 304 a set of wireless access points (that includes at least a subset of the first plurality of access points for which it has collected historical connection data) as being available for wirelessly connecting to a network within a first coverage area wherein the device 104 is located. As used herein, a set includes one or more. A subset means a portion, some, or less than all; and a subset could be as few as one. Thus a subset of the plurality means at least one item in the plurality but less than the total number of items in the plurality. In an alternative use case, the mobile device 104 detects 304 as available all of the access points for which it has collected historical connection data.

For example, the device 104 has a Wi-Fi setting enabled such that the device 104 automatically searches for available access points within a threshold area of the device. An available access point is one that is online and ready for use in forming a wireless connection with the network. During the searching, the device 104 detects the media access control (MAC) address of one or more wireless access points near the device 104 that are available for facilitating a wireless connection. In a further embodiment, the device 104 is also enabled to automatically connect to an access point for which it has stored authentication credentials and which meets certain criteria including, for instance, criteria with respect to the present teachings.

More particularly, in order to select one of the detected access points for a current wireless connection, the device 104 determines 306 an expected connection duration (ECD) for each access point in the set of available access points. In one use case scenario, one or more of the detected access points do not have historical connection data associated therewith because the device 104 has never connected to the network using that access point or has not connected to the access point since resetting the historical connection data. In either case, the device 104 calculates or sets the ECD to the initial reset value (which in Table 1 is 5 minutes) for such detected access points.

However, the expected connection duration for the wireless access points in the subset is derived from the historical connection data. For each available wireless access point in this subset (or in some scenarios all of the available access points), the historical connection data identifies a plurality of previous connections to the network using the wireless access point and identifies corresponding durations of the plurality of previous connections, similar to the data shown in Table 1. In a particular embodiment, for each wireless access point in the subset of the wireless access points, the expected connection duration is derived using a weighted average of the durations of the previous connections using the corresponding wireless access point. Details of such a ECD calculation are described by reference to FIG. 4.

Upon determining 304 the ECD of all of the access points in the set of available access points, the device 104 determines whether to select one of the wireless access points in the set for a current wireless connection to the network. This selecting is based on the expected connection durations for the set of available wireless access points. In an embodiment, the device 104 compares the ECDs to a threshold ($T_h$). This is the threshold that sets the minimum acceptable connection time before the access point is excluded from consideration. In one particular embodiment, $T_h$ is arbitrarily set by the user of the device 104 or is set by the user based on, for instance, a determination of a minimum amount of time needed for a useful wireless connection to the network. Alternatively or additionally, $T_h$ is programmed into the device during manufacturing and is based, for instance, on data that indicates an average connection time that would allow a user to take advantage of a wireless connection.

Particularly, the device 104 determines 310 whether any of the available access points have an ECD that is less than $T_h$. The device 104 then excludes 308 or blocks these access points from consideration for at least the current wireless connection. Thus, in accordance with one use case, the mobile device excludes at least one of the wireless access points in the subset as a candidate for the current wireless connection. Moreover, in accordance with this same use case, the expected connection duration of each excluded wireless access point is below the threshold duration, $T_h$.

The mobile device 104 further determines 312 whether any of the available access points have an ECD that exceeds $T_h$. The device 104 selects 316, for the current wireless connection, the wireless access point in the set having an expected connection duration that exceeds the threshold duration $T_h$. In one particular embodiment, the mobile device 104 selects 316, for the current wireless connection, the wireless access point in the set having a highest expected connection duration. Moreover, in accordance with a further embodiment, where none of the available access points have an ECD>$T_h$, the mobile device 104 refrains 314 from connecting to the network in that coverage area at that time. For an ECD=$T_h$, whether or not the access point is excluded from consideration for the current wireless connection depends on the device 104 configuration.

Figure 4:
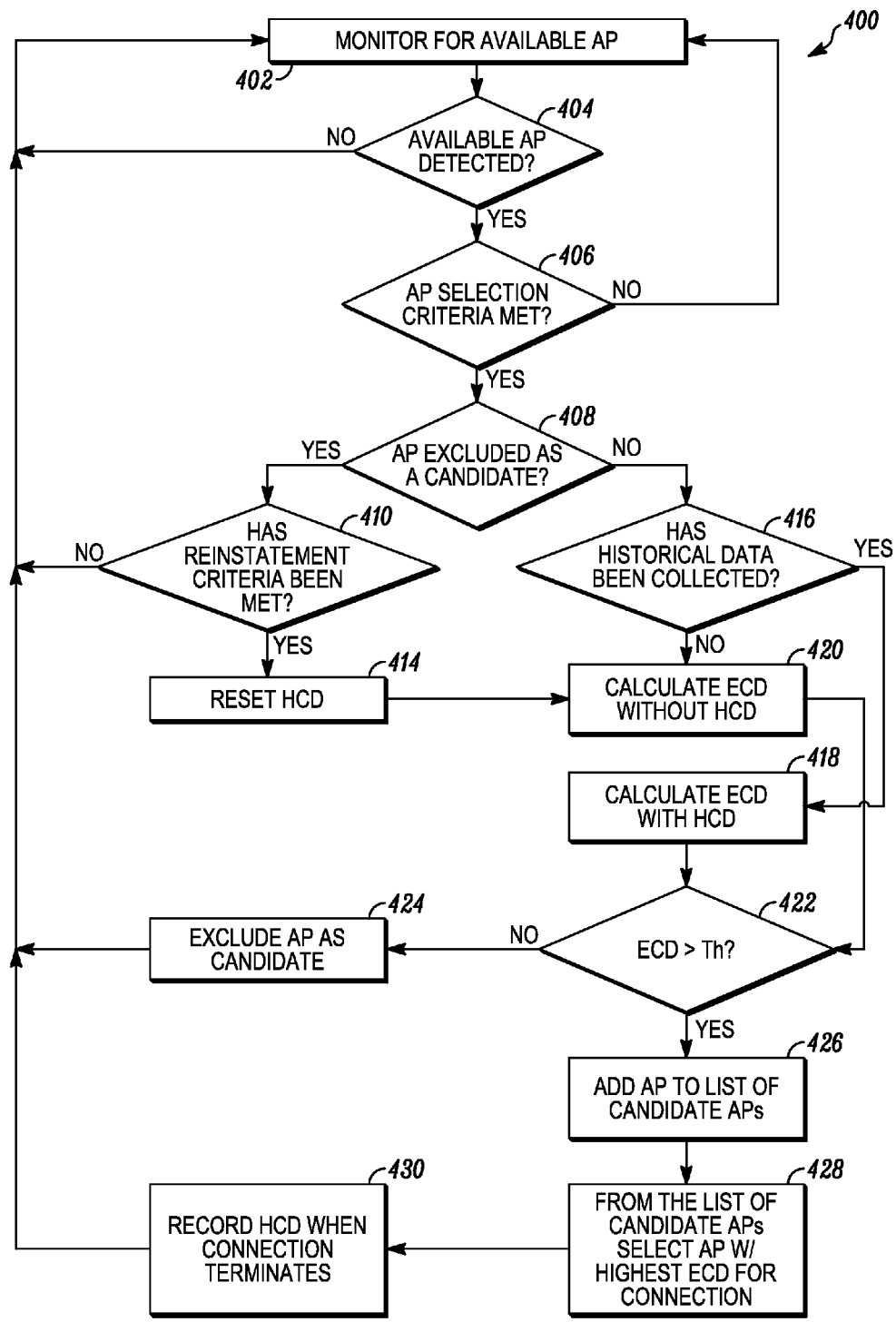
FIG. 4 is a flow diagram showing another embodiment of a method for selecting or excluding an access point for use in wirelessly connecting to a network in accordance with the present teachings.

FIG. 4 illustrates an embodiment of a particular method 400 for selecting or excluding an access point for use in wirelessly connecting to a network in accordance with the present teachings. Specifically, the device 104 monitors 402 for available access points for a current wireless connection to a network. The device 104 continues this monitoring 402 until device 104 determines 404 that it has detected an available access point, for instance by detecting the MAC address of the available access point. For example, the device 104 detects the MAC address of the access point 108.

In one embodiment, an available access point, e.g., 108, has to meet additional selection criteria to qualify as a candidate for the current wireless connection, and the device 104 determines 406 whether the detected access point 108 meets these additional selection criteria. These additional selection criteria are referred to herein as "access point selection criteria." The access point selection criteria are a set of one or more conventional criteria used to prioritize and/or select access points as being available for wirelessly connecting to the network. In accordance with this particular embodiment, once the available access points are determined using this initial set of criteria, the expected connection duration for the available access points can then be calculated and applied to select the final access point used for the wireless connection.

For example, the access point selection criteria include, but is not limited to, operator or user preferences, advertised access point bandwidth, access point selection capabilities such as bit rate capability, etc. At least some of the access point selection criteria are discoverable, for example, using Access Network Query Protocol (ANQP) as defined in the IEEE 802.11u specification and the Wi-Fi Alliance Hotspot (HS) 2.0 specification. Accordingly, in this embodiment, the mobile device 104 is configured with a set of access point selection criteria; and an available access point can be selected as a candidate for the current wireless connection when the access point satisfies the set of access point selection criteria.

Where the detected access point 108 fails to meet the access point selection criteria, the mobile device continues to monitor 402 for another available access point. Conversely, even where the detected access point 108 satisfies the access point selection criteria, the access point 108 may have been previously blocked or excluded from consideration as a candidate for a wireless connection. This occurs, for instance, where the device 104 previously calculated an expected connection duration that is below a threshold duration $T_h$. The device 104 thus determines 408 whether the available access point 108 has been excluded as a candidate for wireless connections.

Where the detected access point 108 has been excluded or blocked, in one particular embodiment, the mobile device 104 does not keep the access point 108 blocked forever. More specifically, the device 104 determines 410 whether the access point 108 has satisfied reinstatement criteria, such as a time criteria. For example, the time criteria can be set for a week or a month or any programmed or user-selected time criteria, wherein the access point is reinstated as a candidate for a wireless connection.

Where the detected access point 108 fails to meet the reinstatement criteria, the mobile device 104 returns to monitoring 402 for an available access point. In an embodiment, where the access point 108 under consideration satisfies the reinstatement criteria, e.g., a time criteria, for consideration as a candidate for use by the mobile device 104 for a wireless connection to the network, the mobile device 104 resets 414 the historical connection data for the access point 108. For example, where the access point 108 has historical connection data associated therewith as shown in Table 1 above and had been blocked for using to wirelessly connect to the network, the mobile device 104 removes the historical connection data for connections 1-4 from memory, e.g., the memory component 224, and retains the initial value of 5 minutes associated with the connection 0. The mobile device 104 then proceeds to calculate 420 the expected connection duration for this available access point 108 without using historical connection data, which can in one embodiment simply be to set the ECD equal to this initial value of 5 minutes.

Returning to decision 408, where device 104 determines that the access point 108 under consideration has not been previously blocked, the device 104 determines 416 whether it has stored historical connection data for the access point 108. If there is no HCD associated with this access point, the device 104 determines 420 the ECD without the HCD, for instance as described earlier. However, if there is HCD associated with the access point 108, the device 104 calculates 418 the ECD using the HCD.

In one embodiment, the expected connection duration is calculated as a function of the durations of the previous wireless connection(s) to the network using the access point 108, where in some instances as in Table 1 there is a plurality of such previous connections. In a particular embodiment, the function is a weighted average of the durations of the previous wireless connections to the network using the access point 108. Equation (1) below provides an example function that allocates a weighted average of the durations of the previous one or more wireless connections using the access point.

$$ECD = [W0^*(<\text{Duration}> \text{ of conn. } 0) + W1^*(<\text{Duration}> \text{ of conn. } 1) + W2^*(<\text{Duration}> \text{ of conn. } 2) + \ldots + Wn^*(<\text{Duration}> \text{ of conn. } n)]/n, \quad (1)$$

where Wi are preconfigured weight factors. In an embodiment, Wi gives more weight to more recent connections. Accordingly, in such a case, the weighed average allocates larger weighting scalars for more recent wireless connections. However, any suitable function can be used with or without corresponding weight factors.

In either circumstance (418 or 420), once the estimated connection duration is determined, the device 104 compares 422 the ECD to a duration threshold $T_h$. For example, $T_h$ is one minute but can be any duration as set by the user or programmed into the device. For instance, where the access point 108 has stored HCD that corresponds to connections 1, 1 and 2, or 1-3, the expected connection duration exceeds the threshold duration $T_h$, and the access point 108 is selected as a candidate for the current wireless connection. In an embodiment, the selected access point 108 is added 426 to a list of candidate APs for the current wireless connection. Thus a candidate access point is one that at a minimum has an ECD>$T_h$, and if other access point selection criteria are considered also meets these criteria.

There may be other access points, e.g., 106, on the candidate list from which to select for the current wireless connection. Where there are other candidate access points, the device 104 selects 428 the candidate access point with the highest expected connection duration among calculated expected connection durations for at least one other available access point. However, where there are no other such candidate access points, the device 104 selects the access point 108 under consideration to facilitate the current wireless connection to the database. Once the device 104 terminates the wireless connection through the selected access point, for instance upon moving out of the range of the access point, the device 104 records 430 HCD for the connection and continues monitoring 402 for an available access point.

Returning to decision 422, where the expected connection duration falls below the threshold duration $T_h$ for the access point 108 under consideration, the mobile device 104 excludes or blocks 424 the access point 108 as a candidate for the current wireless connection and continues to monitor 402 for another available access point. For example, where the HCD for the access point 108 corresponds to connections 1-4 of Table 1, the ECD falls below $T_h$ after the termination of the fourth connection and access point 108 would be blocked from being used for the current wireless connection. In an embodiment, the access point 108 is blocked from an automatic wireless connection. However, the access point is listed and can be, therefore, manually selected by the user 100.

In one implementation scenario, the device 104 belongs to the driver 100, and the device 104 encounters access points 106 and 108 on the user's drive to work every weekday morning. In one particular example use case, access point 106 is in a coffee shop that the user 100 frequents a few times a week and occasionally uses to access the Internet. On the other hand, the access point 108 is near a stoplight that the user 100 drives through on the way to work, and the device 104 rarely maintains a wireless connection using the access point 108 long enough to take advantage of the connection. Accordingly, methods in accordance with the present teachings, e.g., the method 400, can be used to exclude the access point 108 near the stoplight after a few connections.

For instance, the device 104 records historical connection data for the access point 108 as illustrated in Table 1 above. The first ECD determination for access point is the initialization value of 5 minutes. Upon completing the first actual connection (connection 1), the ECD fall to 3 minutes. After the fourth connection, the ECD falls below the minimum acceptable connection time of one minute, and the device 104 excludes the access point 108 as a candidate for wirelessly connecting to the network.

As explained above, the device 104 can reset the HCD in the Table 1 at some point in time so that the access point 108 can again be considered for automatic selection for connecting to the network. However, even while excluded, the user 100 can manually select the access point 108 for a wireless connection. For example, during one trip to work, the user 100 has a flat tire near the access point 108. Although access point 108 has been blocked for automatic selection, the user selects access point 108 since it has the strongest signal to connect to the Internet to access his work server. As can be seen, implementing the above embodiments can be useful, for example, to prevent short-lived wireless connections at every stop light along a route that a user drives every day or, in another implementation scenario, at every train stop of a user's train route.

In the foregoing specification, specific embodiments have been described. However, one of ordinary skill in the art appreciates that various modifications and changes can be made without departing from the scope of the teachings as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The embodiments are defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD- ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a mobile device for selecting or excluding an access point for use in wirelessly connecting to a network, the method comprising:
   collecting historical connection data for a first access point, wherein the historical connection data identifies a plurality of previous wireless connections to the network using the first access point and identifies a corresponding duration of each previous wireless connection;
   detecting that the first access point is available for a current wireless connection to the network;
   calculating an expected connection duration for the first access point using the historical connection data;
   determining whether to select or exclude the first access point as a candidate for the current wireless connection based on the expected connection duration calculated for the first access point.

2. The method of claim 1, wherein the first access point is selected as a candidate for the current wireless connection when the expected connection duration exceeds a threshold duration.

3. The method of claim 2 further comprising selecting the first access point for the current wireless connection when the expected connection duration is a highest expected connection duration among calculated expected connection durations for at least one other available access point.

4. The method of claim 2, wherein the mobile device is configured with a set of access point selection criteria, and wherein the first access point is selected as a candidate for the current wireless connection when the first access point satisfies the set of access point selection criteria.

5. The method of claim 1, wherein the expected connection duration is calculated as a function of the durations of the plurality of previous wireless connections to the network using the first access point.

6. The method of claim 5, wherein the function comprises a weighted average of the durations of the plurality of previous wireless connections to the network using the first access point.

7. The method of claim 6, wherein the weighed average allocates larger weighting scalars for more recent wireless connections.

8. The method of claim 1, wherein the first access point is excluded as a candidate for the current wireless connection when the expected connection duration falls below a threshold duration.

9. The method of claim 8 further comprising resetting the historical connection data for the first access point upon satisfying a time criteria in order to consider the first access point as a candidate for use by the mobile device for a future wireless connection to the network.

10. A mobile device configured to select or exclude an access point for use in wirelessly connecting to a network, the mobile device comprising:
   a memory component configured to store historical connection data that identifies a plurality of previous wireless connections to a network using a first access point and that identifies a corresponding duration of each previous wireless connection;
   a processing device configured to:
      determine that the first access point is available for a current wireless connection to the network;
      predict a connection duration for the first access point using a function of the durations of the plurality of previous wireless connections identified in the historical connection data;
      determine whether to select or exclude the first access point as a candidate for the current wireless connection based on the predicted connection duration for the first access point.

11. The mobile device of claim 10, wherein the processing device is configured to select the first access point as a candidate for the current wireless connection when the predicted connection duration exceeds a threshold.

12. The mobile device of claim 11, wherein the processing device is configured to select the first access point for the current wireless connection when the predicted connection duration is a highest predicted connection duration among predicted connection durations for at least one other candidate access point.

13. The mobile device of claim 10, wherein the function comprises a weighted average of the durations of the plurality of previous wireless connections identified in the historical connection data.

14. The mobile device of claim 10, wherein the processing device is configured to exclude the first access point as a candidate for the current wireless connection when the predicted connection duration is below a threshold duration.

15. A method performed by a mobile device for selecting or excluding a wireless access point for use in wirelessly connecting to a network, the method comprising:
   collecting historical connection data for a first plurality of wireless access points;
   detecting a set of access points as available for wirelessly connecting to the network within a first coverage area, wherein the set includes at least a subset of the first plurality of wireless access points;
   determining for each wireless access point in the set an expected connection duration, wherein the expected connection duration for the wireless access points in the subset is derived from the historical connection data, which identifies a plurality of previous connections to the network using each of the wireless access points in the subset and identifies corresponding durations of the plurality of previous connections for each wireless access point in the subset;

determining whether to select one of the wireless access points in the set for a current wireless connection to the network, wherein the selecting is based on the expected connection durations for the set of wireless access points.

16. The method of claim 15 further comprising selecting, for the current wireless connection, the wireless access point in the set having an expected connection duration that exceeds a threshold duration.

17. The method of claim 16 further comprising selecting, for the current wireless connection, the wireless access point in the set having a highest expected connection duration.

18. The method of claim 15, wherein for each wireless access point in the subset the expected connection duration is derived using a weighed average of the durations of the previous connections using the corresponding wireless access point.

19. The method of claim 15 further comprising excluding at least one of the wireless access points in the subset as a candidate for the current wireless connection.

20. The method of claim 19, wherein the expected connection duration of each excluded wireless access point is below a threshold duration.

* * * * *